US007599996B2

(12) United States Patent
Gupta et al.

(10) Patent No.: US 7,599,996 B2
(45) Date of Patent: Oct. 6, 2009

(54) COMMUNICATION USING DELEGATES, SUCH AS DELEGATES SPECIFIED IN AN EMAIL OR SCHEDULING APPLICATION

(75) Inventors: Anoop Gupta, Woodinville, WA (US); Gurdeep S. Pall, Sammamish, WA (US); Paul W. Haverstock, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 49 days.

(21) Appl. No.: 11/694,674

(22) Filed: Mar. 30, 2007

(65) Prior Publication Data

US 2008/0120421 A1 May 22, 2008

Related U.S. Application Data

(60) Provisional application No. 60/866,380, filed on Nov. 17, 2006.

(51) Int. Cl.
*G06F 15/16* (2006.01)
(52) U.S. Cl. .................. 709/206; 709/203; 709/217; 709/223
(58) Field of Classification Search .............. 709/204, 709/203, 217, 219, 223, 224, 206
See application file for complete search history.

(56) References Cited

U.S. PATENT DOCUMENTS

| | | | |
|---|---|---|---|
| 6,157,945 | A | 12/2000 | Balma et al. |
| 6,301,609 | B1 * | 10/2001 | Aravamudan et al. ....... 709/207 |
| 6,477,374 | B1 | 11/2002 | Shaffer et al. |
| 6,640,230 | B1 | 10/2003 | Alexander et al. |
| 7,139,804 | B2 * | 11/2006 | Bates et al. ................ 709/206 |
| 2002/0174048 | A1 | 11/2002 | Dheer et al. |
| 2003/0007617 | A1 | 1/2003 | McAlinden |
| 2004/0028208 | A1 | 2/2004 | Carnazza et al. |
| 2004/0162881 | A1 * | 8/2004 | Digate et al. ................ 709/206 |
| 2005/0034079 | A1 * | 2/2005 | Gunasekar et al. .......... 715/753 |
| 2005/0057584 | A1 | 3/2005 | Gruen et al. |
| 2008/0010124 | A1 * | 1/2008 | Paek et al. ..................... 705/14 |
| 2008/0040184 | A1 * | 2/2008 | Cragun et al. ................. 705/8 |
| 2008/0109517 | A1 * | 5/2008 | Sarkar et al. ................ 709/206 |

OTHER PUBLICATIONS

"Novell Netmail™ Scalable, Cost-effective E-mail and Calendaring for Your Deskless Workforce," White Paper, © 2002 Novell, Inc., http://www.novell.com/collateral/4621300/4621300.html, [last accessed Dec. 18, 2007].
Microsoft Outlook 2003 vs IBM Lotus Domino Access for Microsoft Outlook 6.5.3, http://www.lotus.com/products/product4.nsf/wdocs/653featurematrix.com, [last accessed Dec. 19, 2007].
U.S. Appl. No. 11/694,625, filed Mar. 30, 2007, Gupta et al.

* cited by examiner

*Primary Examiner*—Lashonda T Jacobs
(74) *Attorney, Agent, or Firm*—Perkins Coie LLP

(57) ABSTRACT

A facility allows for automatic delegation of incoming real-time communications based on a delegation scheme. The delegation scheme may be rules-based and may be applied to a single real-time communication channel or multiple communication channels, including both real-time and non-real-time communication channels. The delegate information may include rules that indicate under what circumstances a communication should be rerouted, which delegate the communication should be rerouted to, and whether other associated actions should be taken in connection with the rerouting (or lack thereof). In some cases, the context of the incoming communication may play a role in how or whether a communication is rerouted to a delegate.

20 Claims, 6 Drawing Sheets

COMMUNICATION USING DELEGATES, SUCH AS DELEGATES SPECIFIED IN AN EMAIL OR SCHEDULING APPLICATION

CROSS-REFERENCE TO RELATED APPLICATION(S)

This application claims the benefit of U.S. Provisional Application No. 60/866,380 entitled "COMMUNICATION USING DELEGATES, SUCH AS DELEGATES SPECIFIED IN AN EMAIL OR SCHEDULING APPLICATION" filed on Nov. 17, 2006, which application is hereby incorporated by reference in its entirety.

BACKGROUND

Several types of communication techniques, including telephone calls, video conference, Voice over IP (VoIP), and instant messaging are valued because they allow persons to communicate in real-time, without delays associated with communication techniques such as letter writing, email, and other types of messaging. Because people often turn to real-time communication techniques with the hope that they can establish immediate contact with persons they are trying to reach, it is often frustrating when a communication attempt of this type fails (e.g., because a person to is unavailable to respond to an incoming call or message). In such a case, the person attempting to establish the communication has few other options but to try again later, leave a voice message, leave an email, try contacting the person on another device, etc.

SUMMARY

A facility (e.g., a software facility) allows for automatic delegation of incoming real-time communications based on a delegation scheme. The delegation scheme may be rules-based and may be applied to a single real-time communication channel (e.g., instant messaging) or multiple communication channels, including both real-time and non-real-time communication channels. For example, in some embodiments, when a user is unavailable, the facility may reroute a telephone call, instant message, or other type of real-time communication mechanism (e.g., walkie-talkie) to a delegate. More specifically, when the phone call, instant message, etc., is received, the facility looks up the recipient's delegate information and routes or transfers the incoming communication accordingly. The delegate information may include rules that indicate under what circumstances a communication should be rerouted, which delegate the communication should be rerouted to, and whether other associated actions should be taken in connection with the rerouting (or lack thereof). For example, if an intended recipient's presence information indicates that the recipient is busy, then a rule may indicate that the call or instant message should be rerouted to a delegate.

In some cases, the context of the incoming communication may play a role in how or whether a communication is rerouted to a delegate. For example, the facility may allow users to define rules that indicate that if a communication is from a recipient's boss (or from another important person) it should be delegated in a certain way (e.g., to a specified delegate, to an immediately available delegate from a list of delegates, etc.). In this way, important rerouted communications have a high chance of immediately reaching a live person.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
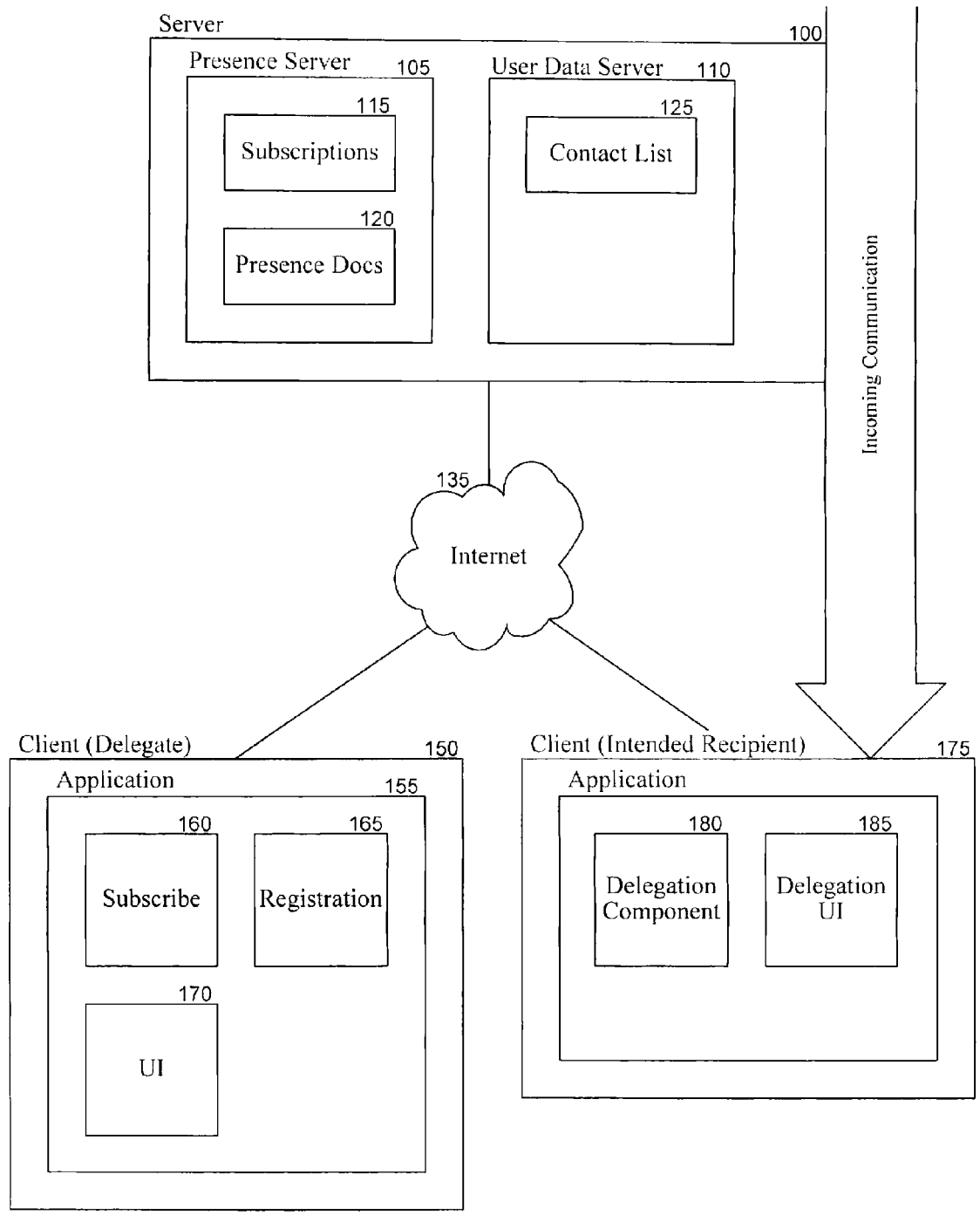
FIG. 1 is a block diagram showing a sample representative environment in which the delegation facility may be implemented in some embodiments.

A facility (e.g., a software facility) that allows for automatic delegation of incoming real-time communications is described herein. A delegation scheme associated with the facility may be rules-based and may be applied to a single real-time communication channel (e.g., instant messaging) or multiple communication channels, including both real-time and non-real-time communication channels.

Delegation may be based, at least in part, on current presence information for users. For example, upon notification of a communication intended for a recipient, the facility may check presence information for the recipient and, if it indicates that the recipient is not available to take the communication, the facility may then retrieve a delegate list for that recipient. The delegate list may specify that the facility is also to check the presence information of delegates to determine whom (e.g., among multiple delegates) the communication should be rerouted to. The facility may also consider the presence/identify information of the party who is the source of the communication to determine how the communication should be handled.

In some embodiments, an intended recipient's presence information may be associated in some way with the presence information of his or her delegates. For example, if a recipient is currently offline, but at least one of his or her delegates is online, then the recipient's presence information may indicate that he or she is online via the delegate.

The facility may provide a delegate designation interface that allows a user to specify other persons as delegates for that user's telephone calls, instant messages, etc., when the user is otherwise unavailable. Currently, delegate designation schemes exist for email and calendar programs such as Microsoft Outlook/Microsoft Exchange. For example, in Microsoft Outlook, delegates may be given access to a user's Inbox, and other Outlook folders. This access may include permission to open folders, read, create, or delete items, respond to emails, meeting requests, and tasks intended for the user, organize meetings on behalf of the user, etc. Accordingly, in some embodiments, the facility's delegate designation interface for real-time communications may be similar to that used in Microsoft Outlook for emails, or may even comprise an extension thereof. For example, the delegate information may be applicable to multiple communication modes (e.g., email, scheduling, IM, and telephone). Other delegate designation interfaces that are not similar to those used in Microsoft Outlook/Microsoft Exchange may also be used.

In some embodiments, one or more of a recipient's delegates may be a "bot" or other automated functionality that is responsive to human communication. The delegate bot (or "delebot") may be associated with an interactive voice response unit that can recognize the commands or voice of a communication initiator and take appropriate actions. For example, if the communication initiator is the spouse of the intended recipient, then the delegate bot may recognize that this is the case and may respond in a specific way (e.g., "Hello Mr. Smith. This is Sandy's delebot. She told me to pass on that she will call you as soon as she gets in, but that you need to pick up Jr. from the softball game at 3:00 p.m.").

Various aspects of the delegation process may be logged or otherwise recorded. In this way, the intended recipient can determine how his or her communications were handled/addressed throughout the day. For example, the facility may create a record for each incoming communication. The record may specify whether each communication was delegated, who the delegate was, how the communication was handled, the outcome of the communication, action items resulting from the communication, etc. In the case of a bot delegate, the facility may log even more detailed information such as a recording or transcription of the entire conversation between the bot and the communication initiator. More generally, in some embodiments, whenever a communication is made, an email or other notification may be sent out or otherwise provided.

I. Sample Representative Environment

FIG. 1 is a block diagram that illustrates components of the communication delegation facility in an embodiment that uses presence information. A real-time communication service is made up of a server 100 connected to one or more clients 150 and 175 through the Internet 135. The server 100 contains a presence server 105 and a user data server 110. The presence server 105 contains a subscriptions component 115 and a presence document store 120. The subscriptions component 115 maintains, for each user, the current list of users who are subscribed to that user's presence information. The presence document store 120 contains the presence document for each user indicating the user's current status on the instant messaging service (e.g., online, offline, busy, do not disturb, etc.). The user data server 110 maintains persistent data for each user and contains a contact list store 125. The contact list store 125 contains a list of each user's contacts. The server 100 provides the list of contacts of a user to registered endpoints of that user (e.g., endpoints such as a desktop computer, a telephone, a notebook computer, a PDA, etc.).

The clients 150 and 175 each contain at least one application 155 that enables real-time communication such as an instant messaging application, a Voice over IP application, a telephone system interface application, etc. The application 155 contains a subscribe component 160, a registration component 165, and a user interface component 170. The subscribe component 160 subscribes to the presence information of a user's contacts. The registration component 165 registers the endpoint of a user with the real-time communication service and publishes updates to the user's presence information. The user interface component 170 provides windows and other graphical elements that are presented to the user while interacting with the application 155.

The clients 150 and 175 may also each contain a delegation component 180 with a corresponding interface 185 that allows the user to identify delegates and to define rules associated with those delegates. In some embodiments, the delegation component 180 is associated with an email and/or calendar application such as Microsoft Outlook (not shown). It may also be implemented separately from an email and/or calendar application. Whether or not it is implemented separately from an existing email and/or calendar application, the delegation component 180 may be specific to one or more real-time communication techniques (e.g., IM and/or telephone) or more comprehensive (e.g., applicable to a variety of communication techniques, which may possibly include both real-time and non-real-time communication techniques).

In a typical scenario, a communication initiator initiates a communication via, for example, a telephone or via the real-time communication service. The communication is destined for an endpoint associated with the intended recipient. If the delegation component 180 is activated and the intended recipient is unavailable to respond to the incoming communication, the delegation component 180 may intercept the incoming communication and determine how it should be handled based on rules and/or presence information associated with the intended recipient, the communication initiator, and/or delegates identified by the intended recipient. In each case (initiator, recipient, or delegate), presence information may be available when the respective application 155 invokes the registration component 165 to register that user's endpoint with the user data server 110 and presence server 105, retrieve the user's list of contacts, and provide initial presence information about the user. The application 155 invokes the subscribe component 160 to subscribe to each of the user's contacts. The presence server 105 provides an initial presence document about each of the subscribed contacts, and sends an updated presence document when the presence for any of the contacts changes. In this way, the delegation component 180 can take appropriate action (e.g., transfer a call to an available delegate, invoke a "delebot" program to provide automated delegation services, etc.).

The computing devices on which the system is implemented may each include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, mini-computers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

II. Specifying Delegates and/or Rules

Figure 2:
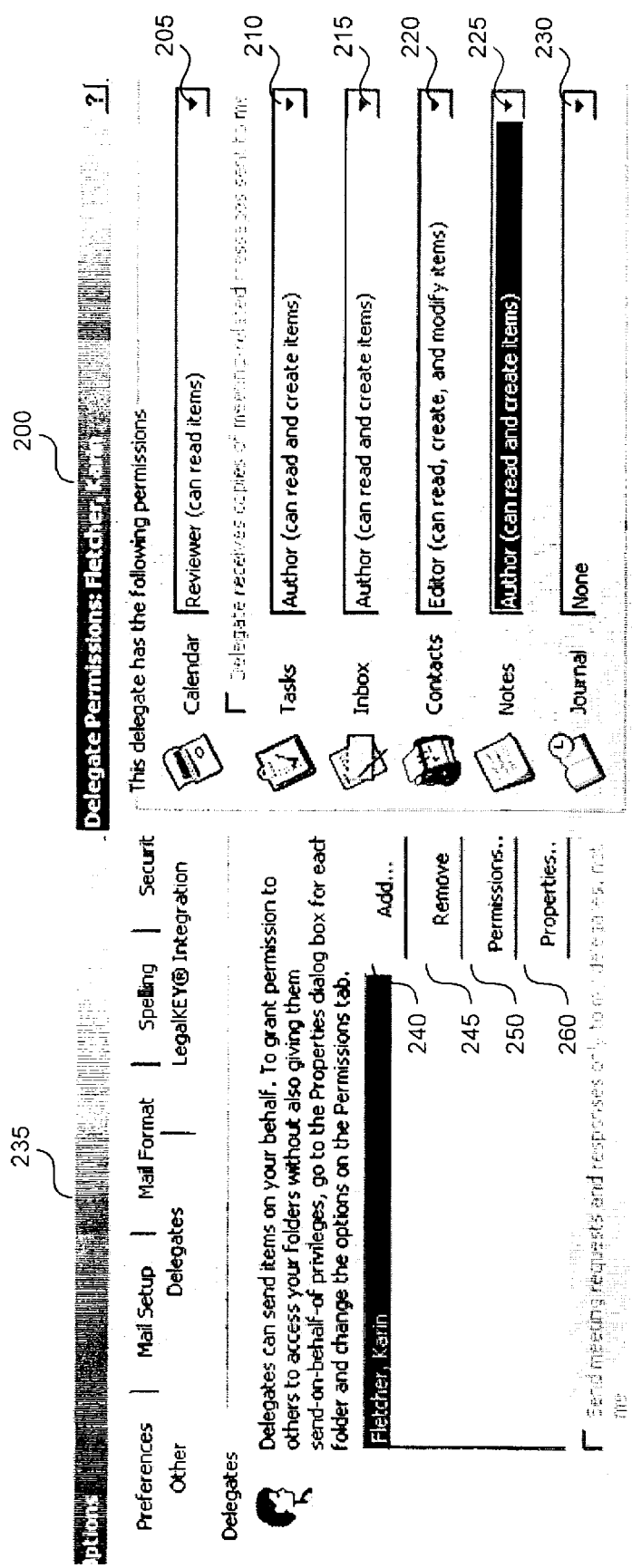
FIG. 2 is a display diagram showing a prior art interface for setting delegate information in a calendar/email program, such as Microsoft Outlook.

FIG. 2 (prior art) is a display diagram showing an example of a two screen shots for setting delegate information in Microsoft Outlook/Microsoft Exchange. More specifically, the right-hand screen shot 200 of FIG. 2 shows setting delegates for variety of action types, including Calendar actions 205, Task actions 210, Inbox actions 215, Contacts actions 220, Notes actions 225, and Journal Actions 230. In the illustrated embodiment, for each type of action, the user can set delegate permission levels as follows: None; Reviewer (can read items); Author (can read and create items); and Editor (can read, create, and modify items).

The left-hand screen shot 235 of FIG. 2 shows an interface for adding (Add button 240) and removing persons (Remove button 245) to/from a list of delegates. The list in the example shows only one delegate (Karin Fletcher). The screen to the right 200 is displayed when a delegate from the list is selected and a Permissions button 250 is clicked. A properties button 255, when selected, allows the user to identify properties associated with the delegate, including contact information, information about the delegate's role(s) within an organization, or anything else that is useful to know about the delegate. In the case of automated delegates (e.g., delebots) the properties information may include programs and rules that allow the delebot to execute as desired.

Figure 3:
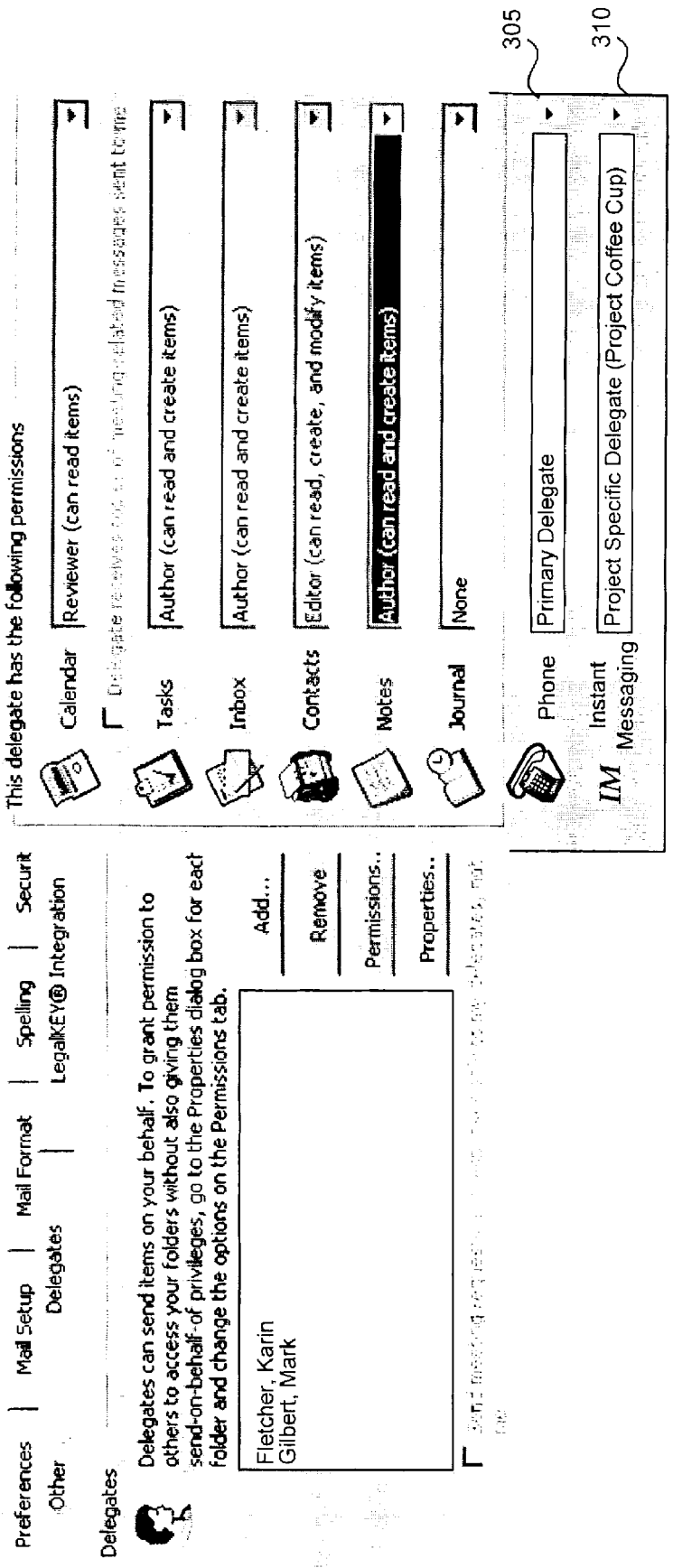
FIG. 3 is a display diagram showing an interface for setting delegate information with respect to real-time communications.

FIG. 3 is a display diagram showing an example of two screen shots for setting delegate information in Microsoft Outlook (or a similar application), but with the addition of two new actions types related to real-time communication, including telephone 305 and instant messaging (IM) 310. Because assigning delegates in the context of real-time communications involves different considerations than assigning delegates in the context of Calendar actions, Task actions, Inbox actions, etc., the permission levels (e.g., Primary Delegate, Project Specific Delegate) may also be different for these types of actions. An example set of permission levels for such real-time communications are displayed in the table below.

TABLE A

| Permission Level Example | Description |
| --- | --- |
| General Delegate | User gives permission to transfer any non-critical communication to this delegate |
| Critical Delegate | User gives permission to reroute critical communications to this delegate. |
| Primary Delegate | User gives permission to reroute all communications to this delegate when available. |
| Secondary Delegate | User gives permission to reroute all communications to this delegate when the primary delegate is not available. |
| Reserve Delegate | User gives permission to reroute communications to this delegate when other delegates are not available. |
| Project Specific Delegate (Project ID) | User gives permission to reroute communications related to a specific project or task to this delegate. |
| Entity Specific Delegate (Entity ID) | User gives permission to reroute communications related to a specific person or entity to this delegate. |
| Media Specific Delegate (Media Type) | User gives permission to reroute communications presented on a specified medium (e.g., IM, VoIP, walkie-talkie, telephone, video conf., etc.) to this delegate. |
| Delebot Delegate | User gives permission to reroute specified communications to non-human delegate having a programmable set of communication capabilities. |
| Time Sensitive Delegate (Time/Day) | User gives permission to reroute specified communications to this delegate at certain times/days. |

The user may also set recipient party rules that determine under what circumstances he or she is unavailable, which define when the facility will reroute a communication to a delegate. In some embodiments, the recipient party rules may relate to presence information. For example, if such rules are linked to presence information, the user may specify that he or she is unavailable (for the purpose of rerouting incoming communications to delegates) whenever he or she has a presence status of offline, online but on the phone, online but busy, etc. The rules that determine whether or not a recipient party is unavailable may also be based on who is the incoming communication is from. For example, the recipient party may specify that he or she is available if his or her spouse or his or her boss is calling, but unavailable if an unknown party is calling. The identity of the party who is initiating the communication may be known through techniques such as caller ID, session initiation protocol (SIP) message, etc. Similarly, the delegate's current presence status (e.g., online, offline, at home, etc.) may determine whether the caller is available or unavailable.

III. Representative Flow Diagrams

Figure 4:
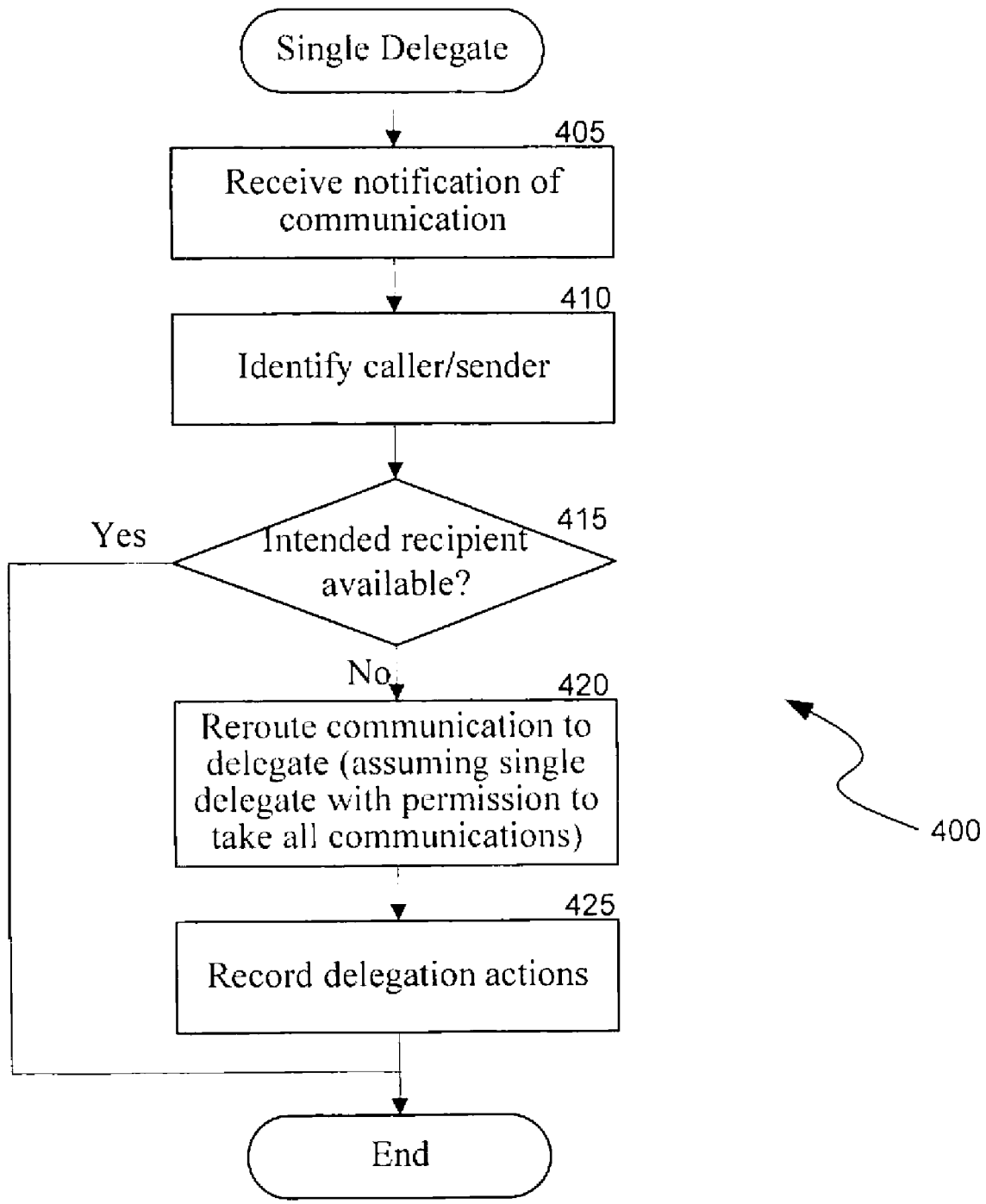
FIG. 4 is a flow diagram showing a routine for rerouting a call or real-time message to a delegate when the recipient has only one delegate.
Figure 5:
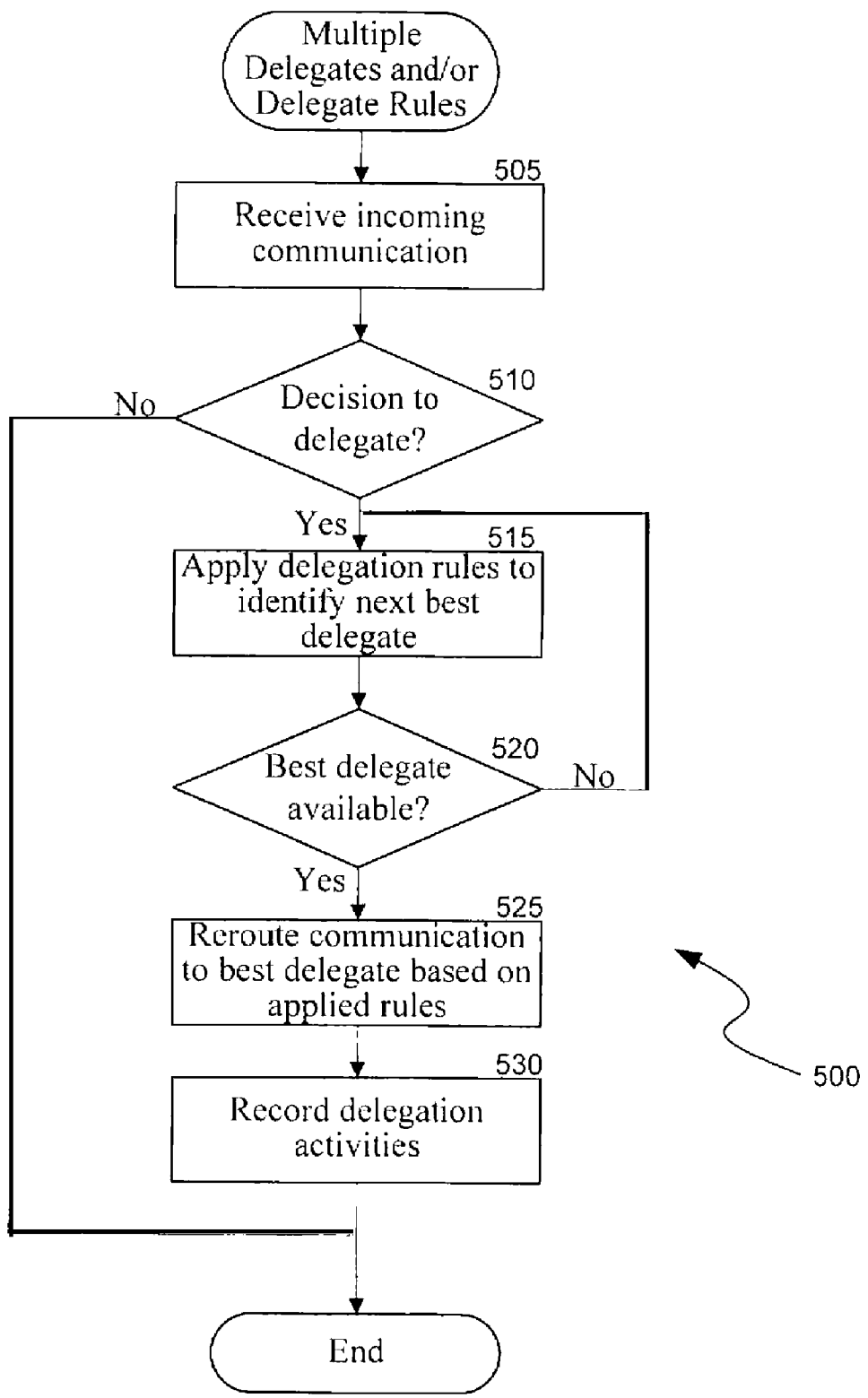
FIG. 5 is a flow diagram showing a routine for rerouting a call or real-time message to a delegate when multiple delegates and/or specific rules exist for when a delegate should be used.

FIGS. 4 and 5 are flow diagrams showing examples of routines executed by aspects of the facility. More specifically, FIG. 4 is a flow diagram showing an example of a delegate routine 400, wherein an incoming communication is rerouted to a specified delegate when an intended recipient is not available. The routine 400 of FIG. 4 assumes that there is only one delegate. However, aspects of this routine 400 can be applied in the context of multiple delegates, such as is described with respect to FIG. 5.

At block 405, the routine 400 receives an indication of an incoming communication. For example, the routine 400 may receive an invitation to conduct a Voice over IP session or a subscription request for an instant messaging session. The routine 400 may also detect an incoming telephone call. At block 410, the routine 400 determines the identity of the party who initiated the communication. For example, the routine 400 may be able to identify the party based on information in a session initiation protocol (SIP) message or via caller ID capabilities. The identity determination at block 410 may also be skipped in some embodiments. At decision block 415, the routine 400 determines whether the intended recipient is available. This may involve checking the current presence information/status of the intended recipient and/or another indicator of whether the intended recipient is available. If the intended recipient has established rules to treat incoming communications from specified parties differently from those of unspecified parties, the routine 400 may also perform a rule look up as part of checking the availability of the intended recipient.

If, at decision block 415, the routine 400 determines that the intended recipient is available, the routine 400 ends. Otherwise, the intended recipient is not available (at least with respect to that caller/sender) and the routine 400 proceeds to block 420 to reroute the communication to a delegate (assuming the intended recipient has only one delegate who has permission to receive all incoming communications). If the delegate is not available, the caller/sender may be allowed to leave a message for later receipt by the intended recipient and/or the delegate, hang up and try again, etc. At block 425, the routine 400 creates a record of delegation activities (e.g., summary fact sheet regarding delegation transaction, actual recording/transcription of delegation conversation, etc.).

FIG. 5 is a flow diagram showing an example of a delegation routine 500 assuming there is more than one delegation choice if it is determined that the incoming communication should be delegated. At block 505, the routine 500 receives a notification indicating an incoming communication. At decision block 510, the routine 500 determines whether the communication should be delegated (see, e.g., FIG. 4). If the communication should not be delegated, the routine 500 ends. Otherwise, the routine 500 continues at block 515 where the routine 500 applies one or more delegation rules to identify an appropriate delegate (if such a delegate exists). In applying these rules, the routine 500 may consider factors such as the source of the communication (e.g., unknown party, VIP, known party, etc.), the topic of the communication, the preferences of the user as to primary/secondary delegates, the time that the communication is received, the nature of the communication, the medium over which the communication was made, etc. For example, the routine 500 may determine, based on the identity of the communication initiator, that four delegates have permission to receive the communication. The routine 500 may then examine which of the four delegates is best (e.g., primary versus secondary, time specific, topic specific, etc.). For example, if one of the four delegates is listed as a primary delegate and the other three are listed as reserve delegates, the routine 500 will pick the primary delegate as the most appropriate delegate.

At decision block 520, the routine 500 checks whether the selected best delegate is available (e.g., based on presence information for the delegate). If the delegate is available, the routine 500 proceeds to block 525 to reroute the communication to that delegate. Otherwise, the routine 500 loops back to block 515 to find a next best delegate. For example, if the primary delegate is not available, and of the three remaining delegates, one is given express permission to take communications within a current time frame (e.g., a time sensitive delegate), the routine 500 may pick the reserve delegate to attempt to reroute the communication to. In some embodiments, where there are multiple appropriate delegates, the routine 500 may randomly or systematically pick the next best delegate from that group.

At block 530, the routine 500 creates a record of delegation activities (e.g., summary fact sheet regarding delegation transaction, actual recording/transcription of delegation conversation, etc.). This is especially useful when an automated bot is selected as the delegate so that the intended recipient can go back and see how the bot handled the communication.

Figure 6:
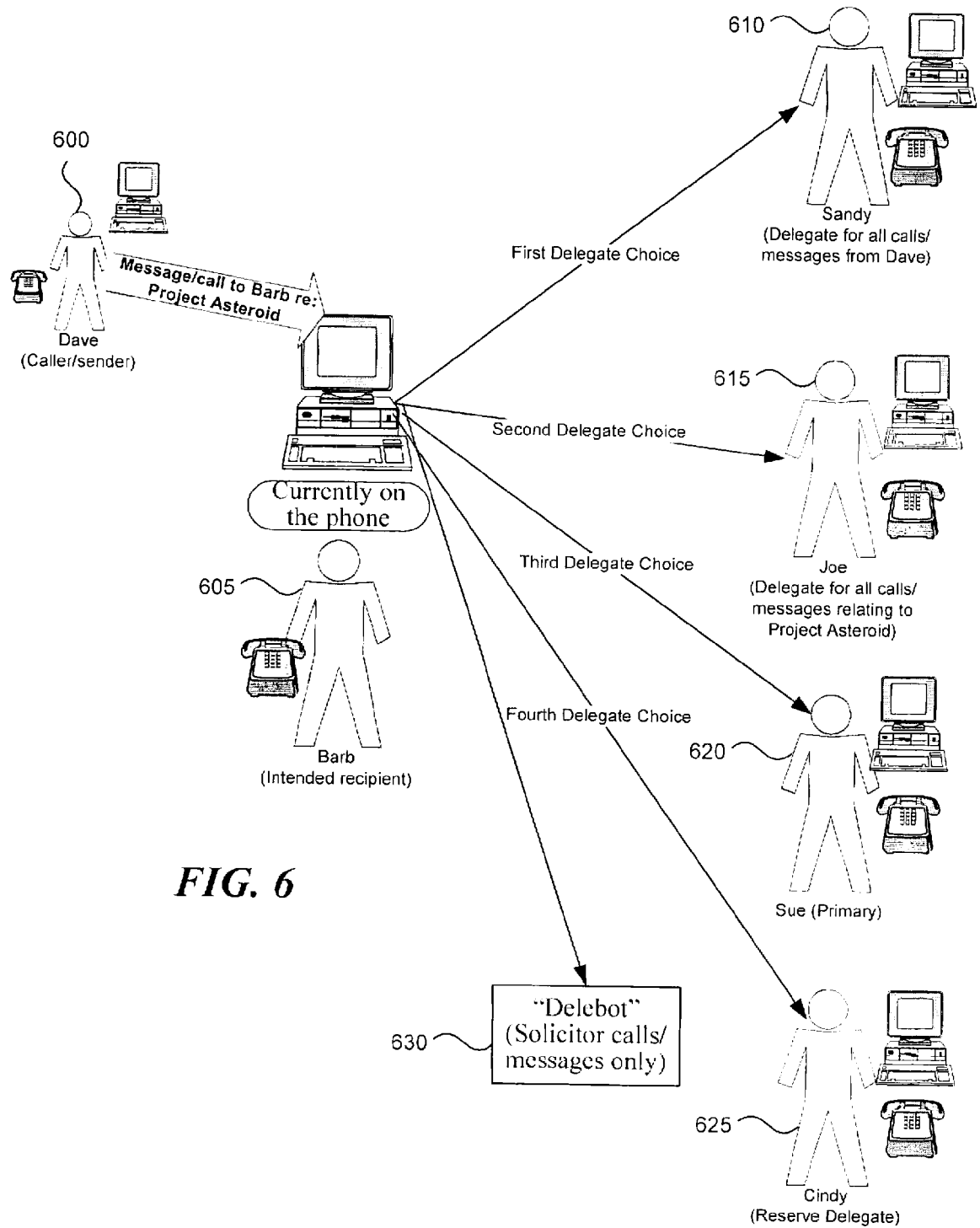
FIG. 6 is a block diagram showing an example of a flow of communications through a system employing a delegation facility, such as the facility of FIG. 1.

FIG. 6 is a block diagram showing an example of the flow of communications through a system employing a delegation facility, such as the facility of FIG. 1. A communication initiator (Dave) 600 is attempting a communication (e.g. an IM message or call) with an intended recipient (Barb) 605, who is currently on the phone and, therefore, unavailable. Dave's communication is in regards to a project code-named "Project Asteroid."

Barb 605, the intended recipient of Dave's communication has established a list of delegates comprising Sandy 610 (a delegate for all calls/messages from Dave), Joe 615 (a delegate for all calls/messages relating to Project Asteroid), Sue 620 (a primary delegate), and Cindy 625 (a reserve delegate). Barb 605 may also have an automated delebot 630, for receiving certain calls or messages (e.g., calls or messages that are from a source that is suspected to be a solicitor), which in this case, would not apply.

Assuming all the delegates are available, in some embodiments, the facility may reroute the communication to Sandy 610, because she has been given special permission to receive communication from Dave 600. If Sandy 610 is not available, then the facility may reroute the communication to Joe 615, who has received permission to receive all communications relating to Project Asteroid. If neither Sandy 610 nor Joe 615 is available, then the facility may reroute the communication to Sue 620, Barb's primary delegate. If Sue 620 is not available, the facility may reroute the call/message to Cindy 625, Barb's reserve delegate, and so on.

This is just one example of an application of delegation rules. In other embodiments, the facility may reroute the call/message to Sue 620 first, or even to Joe 615. Many other rules types or combinations of rules and many applications of rule types may be practiced without departing from the scope of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computer system for determining whether to reroute an incoming communication to a delegate identified by a user for which the communication is intended, the method comprising:

receiving a specification of delegate information, wherein the specification of delegate information is received in association with an application primarily used for non-real time communications including email and scheduling;

receiving an indication of an incoming real-time communication, wherein the incoming real-time communication is intended for the user;

determining whether the user is available or unavailable to receive the incoming real-time communication; and if the user is unavailable to receive the incoming real-time communication, selecting by the computer system a delegate to whom to reroute the incoming real-time communication, wherein selecting the delegate is based on the delegate information; and directing by the computer system to reroute the incoming real-time communication to the selected delegate so that the selection of a delegate for the incoming real-time communication is based on the specified delegate information received in association with the application primarily used for non-real time communications rather than an application primarily used for real-time communications.

2. The method of claim 1 wherein the application primarily used for non-real time communications is Microsoft Exchange or Microsoft Outlook.

3. The method of claim 1 wherein determining whether the user is available or unavailable to receive the incoming real-time communication is performed, at least in part, by an application that is distinct from the application primarily used for non-real-time communications.

4. The method of claim 1 wherein determining whether the user is available or unavailable to receive the incoming real-time communication is based on presence information associated with the user.

5. The method of claim 1 wherein selecting a delegate to whom to reroute the incoming real-time communication is based, at least in part, on presence information for potential delegates.

6. The method of claim 1 wherein selecting a delegate to whom to reroute the incoming real-time communication is based, at least in part, on presence information associated with a sender of the real-time communication.

7. The method of claim 1 wherein the communication is not an email or a meeting invitation.

8. The method of claim 1, further comprising:
rerouting the communication to the selected delegate; and
recording aspects of the communication associated with rerouting the communication to the selected delegate.

9. The method of claim 1 wherein the selected delegate is a primary delegate who has permission to receive all communications intended for the user.

10. The method of claim 1 wherein the selected delegate is a secondary delegate who has permission to receive communications intended for the user when a primary delegate is unavailable.

11. The method of claim 1 wherein the communication is associated with an instant message.

12. A computing device for determining whether to route an incoming real-time communication to a delegate specified by a recipient for whom the communication is intended, the real-time communication being a telephone call, the system comprising:
a processor;
a memory having stored thereon computer-executable instructions to implement components comprising:
an application configured primarily for handling non-real time communications;
a delegation component of the application configured for specifying a list of delegates and for determining delegates to whom incoming real-time communications should be routed based on availability of the recipient and a delegate specified using the application configured primarily for handling non real time communications;
a communication receiving component that receives an indication of an incoming telephone call for the recipient and determines that the recipient is currently unavailable;
a communication forwarding component configured for forwarding the incoming telephone call to the delegates identified using the delegation component based on the determination of whether the recipient is currently unavailable.

13. The computing device of claim 12 wherein the non-real time communications include communications associated with email and scheduling.

14. The computing device of claim 12 wherein the delegation component is a rules-based component, and wherein the delegation component is associated with a user interface for specifying delegates and for specifying rules used for granting permissions to those delegates.

15. The computing device of claim 12 wherein the delegation component is a rules- based component, and wherein rules associated with the delegation component include rules relating to a source of the communication, rules relating a context of the communication, rules related to a timing of the communication, rules relating to a nature of the communication and/or rules related to status of delegates.

16. The computing device of claim 12 where the application is Microsoft Exchange or Microsoft Outlook.

17. A computer-readable storage medium containing instructions for controlling aspects of a computing device to perform a method comprising:
providing a list of delegates in association with a software application used for personal information managements;
displaying an interface for a user to grant permission for one or more delegates of the list, the permission to access information intended for management by the user, and wherein the application is not intended to facilitate instant messaging or telephony communications;
receiving from the user an indication to grant permission to one or more delegates;
applying the list of delegates to determine a delegate for an incoming communication intended for the user when the user is not available to receive the incoming communication based on permission granted to the delegates, wherein the incoming communication is not an email or a scheduling request sent via email; and
based on a determination that the user is not available, rerouting the incoming communication to the determined delegate.

18. The computer-readable storage medium of claim 17 wherein the software application is Microsoft Outlook or Microsoft Exchange.

19. The computer-readable storage medium of claim 17 wherein the communication is an instant message sent by a sender or a telephone call sent by a caller, and wherein delegating the communication is based on determining the identity of the sender or the caller.

20. The computer-readable storage medium of claim 17 wherein the applying of the list of delegates to determine is based on determining the identity of a user that initiated the communication, and wherein determining the identity includes receiving a session initiation protocol (SIP) message containing identity information.

* * * * *